United States Patent [19]

Takase

[11] Patent Number: 5,321,548
[45] Date of Patent: Jun. 14, 1994

[54] REAL IMAGE MODE VARIABLE MAGNIFICATION FINDER OPTICAL SYSTEM

[75] Inventor: Hiroshi Takase, Hachiouji, Japan

[73] Assignee: Olympus Optical Co., Ltd., Tokyo, Japan

[21] Appl. No.: 950,702

[22] Filed: Sep. 25, 1992

[30] Foreign Application Priority Data

Sep. 26, 1991 [JP] Japan .................. 3-247775

[51] Int. Cl.⁵ .................. G02B 23/14; G02B 15/04; G02B 5/04; G03B 13/10
[52] U.S. Cl. .................. 359/431; 359/421; 359/837; 359/726; 355/222; 355/224
[58] Field of Search .............. 359/421, 422, 431, 837, 359/821, 726; 355/222, 224

[56] References Cited

U.S. PATENT DOCUMENTS

| Re. 17,995 | 3/1931 | Mitchell | 359/726 |
| 976,370 | 11/1910 | Humbrecht et al. | 359/726 |
| 1,097,635 | 5/1914 | Takase | 359/726 |
| 1,668,015 | 5/1928 | Harris | 359/726 |
| 3,645,602 | 2/1972 | Clave et al. | 359/421 |
| 4,779,969 | 10/1988 | Sato et al. | |

FOREIGN PATENT DOCUMENTS 62-7017  1/1987  Japan .
1255825  10/1989  Japan .

OTHER PUBLICATIONS

Takase Appln. No. 07/951,000.

*Primary Examiner*—Jon W. Henry
*Attorney, Agent, or Firm*—Cushman, Darby & Cushman

[57] ABSTRACT

A real image mode variable magnification finder optical system comprising an objective lens system including a rotatable prism, an image erecting optical system for erecting an image formed by the objective lens system and an eyepiece lens system having a positive refractive power. The prism is rotated 180° for changing the finder optical system between a wide angle condition and a telephoto condition. This variable magnification finder optical system permits minimizing a space required for operating an optical member for changing a magnification thereof and composing the objective lens system compactly of a small number of component parts.

6 Claims, 7 Drawing Sheets

FIG. 4A
WIDE ANGLE CONDITION
FIG. 4B
TELE-PHOTO CONDITION
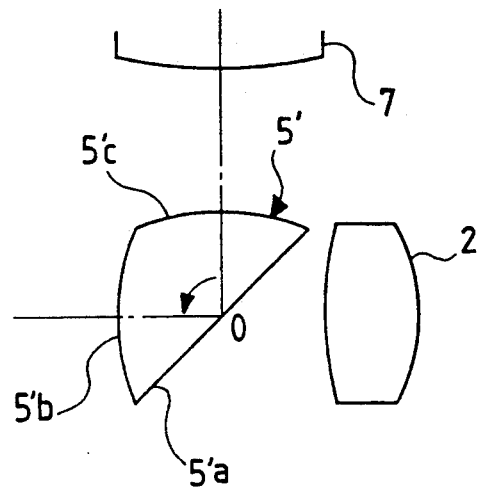
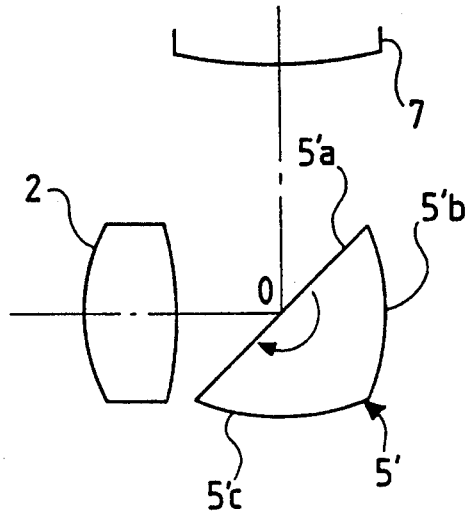
FIG. 5A
WIDE ANGLE CONDITION
FIG. 5B
TELE-PHOTO CONDITION
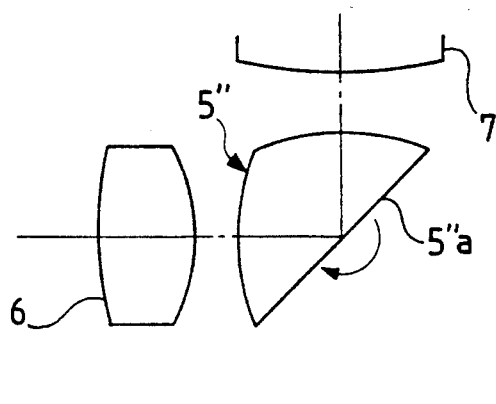
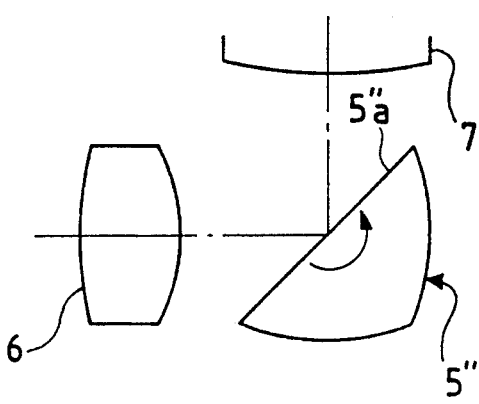

WIDE ANGLE CONDITION

TELE-PHOTO CONDITION

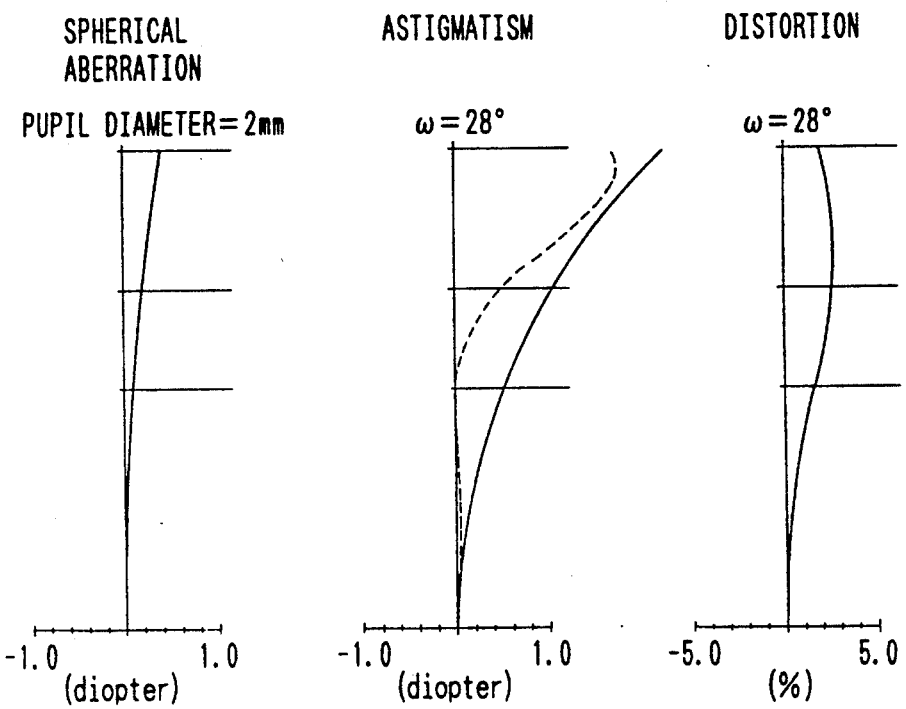
FIG. 8 — WIDE ANGLE CONDITION
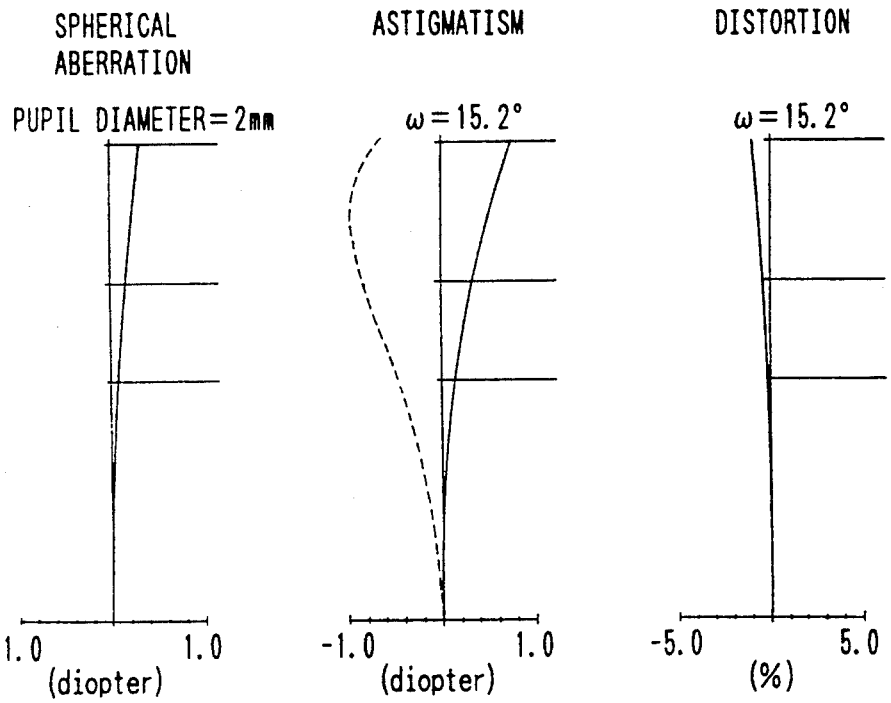
FIG. 9 — TELE-PHOTO CONDITION

WIDE ANGLE CONDITION

TELE-PHOTO CONDITION

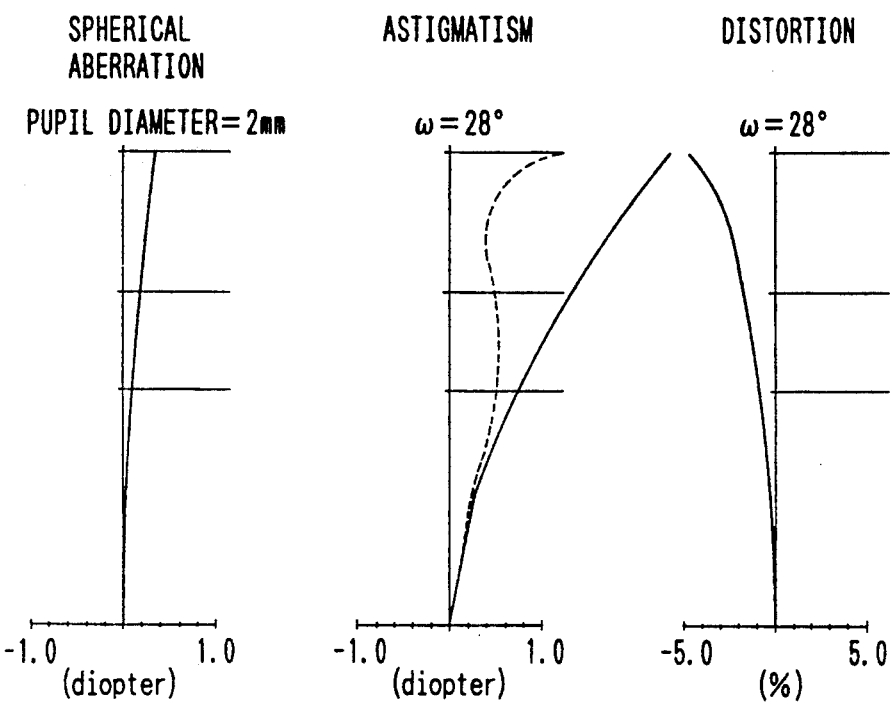
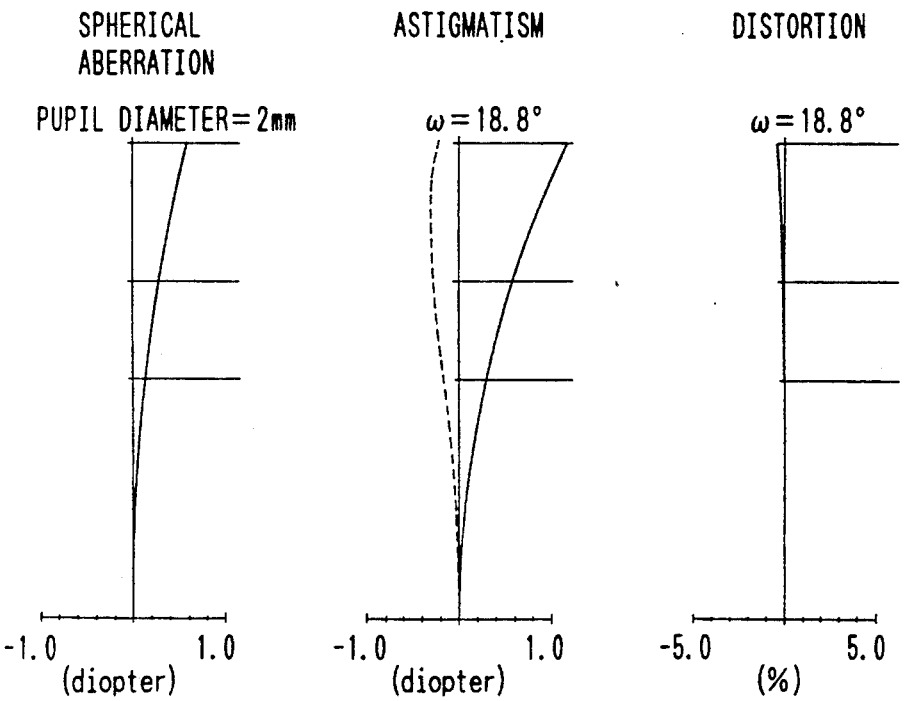

REAL IMAGE MODE VARIABLE MAGNIFICATION FINDER OPTICAL SYSTEM

BACKGROUND OF THE INVENTION a) Field of the Invention

The present invention relates to a real image mode variable magnification finder optical system which is to be used with photographic cameras, video cameras, still video cameras and so on.

b) Description of the Prior Art

For a camera composed of an imaging optical system and a finder optical system which are generally separated from each other, it is necessary to change a magnification of the finder optical system for adequate display of a photographic range the moment that a focal length of the imaging optical system is changed. The magnification of the finder optical system is changed, for example, in the manners described below:

First, in case of a finder optical system disclosed by Japanese Patent Preliminary Publication No. Hei 1-255825 disposed on the object side of an objective lens system is an auxiliary afocal lens system so as to be removable from an effective optical path of the finder optical system, and the magnification of the finder optical system is changed by inserting and removing this auxiliary lens system into and out of the optical path depending on a selected imaging magnification.

Further, in a finder optical system disclosed by Japanese Patent Preliminary Publication No. Sho 62-7107, an objective lens system is composed of three lens components having negative, positive and positive refractive powers respectively in order from the object side and the magnification of the finder optical system is changed by moving the second lens component in a direction along an optical system.

In a finder optical system disclosed by Japanese Patent Application No. Hei 2-146793 which was proposed by the inventor, in contrast, two objective lens systems having magnifications different from each other are fixed in parallel with each other and an optical path of one objective lens systems coincides with that of the other objective lens system by using two reflecting members. The magnification of the finder optical system is changed by rotating one of the reflecting members so as to change the optical path of one of these objective lens systems.

In a finder optical system disclosed by Japanese Patent Preliminary Publication No. Hei 1-255825 wherein the auxiliary lens system is inserted and removed into and out of the effective optical path of the finder optical system, however, it is necessary to reserve a space for disposing the auxiliary lens system and an additional space for allowing the insertion and removal of the auxiliary lens system. Therefore, this finder optical system has a remarkably long total length and has a thickness which can hardly be reduced. This fact poses an important problem in view of a fact that the finder optical system of this type is adopted frequently for various types of small cameras such as compact cameras. Further, since the auxiliary lens system which is to be disposed on the object side of the objective lens system must be of an afocal lens system, this auxiliary lens system must comprise at least one positive lens element and a negative lens element, thereby delimiting reduction of number of parts to be used for composing the finder optical system.

In the case of the finder optical system disclosed by Japanese Patent Preliminary Publication No. Sho 62-7017, a total length of the finder optical system is not varied by changing the magnification thereof. However, the objective lens system is composed, in order from the object side, of the negative, positive and positive lens components, a distance as measured from the first lens component to a focal point of the objective lens system is longer than a focal length of the first lens component, thereby posing a problem that a total length of the objective lens system can not be shortened inherently.

In case of the finder optical system disclosed by Japanese Patent Application No. Hei 2-146793 wherein the magnification of the finder optical system is changed by rotating the reflecting member while the two objective lens systems are kept fixed, in contrast, the finder optical system has a total length which cannot be varied by changing the magnification thereof and the objective lens systems can independently be composed compact at magnification levels thereof, whereby the finder optical system can prevent cameras from being enlarged or permits designing the cameras compact. However, this finder optical system has a defect that it requires an increased number of parts since the two reflecting members are used in a pair for changing the magnification of the finder optical system.

SUMMARY OF THE INVENTION

In view of the problems described above, it is a primary object of the present invention to provide a real image mode variable magnification finder optical system wherein a magnification of the finder optical system is changed by inserting and removing an optical member into and out of an optical path by moving the optical member within a possible minimum space and without substantially increasing a size of the finder optical system.

The variable magnification finder optical system comprises, in order from the object side, an objective lens system having a positive refractive power, an image erecting optical system for reversing an image formed by the objective lens system and an eyepiece lens system having a positive refractive power. The objective lens system comprises a rotatable prism which is rotated, for changing a magnification of the finder optical system, between a first position at which a light bundle passing through the objective lens system is allowed to pass into the prism and be reflected by a reflecting surface thereof, and a second position at which the light bundle passing the objective lens system is allowed to be incident on the reflecting surface from outside the prism and be reflected by the reflecting surface.

In a preferred formation of the present invention, the prism functions as a lens element.

The variable magnification finder optical system according to the present invention, which adopts the objective lens system comprising the rotable prism for holding the optical path by the reflecting surface thereof, makes it possible to minimize the space required for rotating the optical member for changing the magnification of the finder optical system, compose the objective lens system of a small number of parts, and design the finder optical system compact as a whole.

This and other objects as well as the features and the advantages of the present invention will become apparent from the following detailed description of the preferred embodiments when taken in conjunction with the accompanying drawings.

BRIEF DESCRIPTION OF THE DRAWINGS

FIG. 4A and FIG. 4B are sectional views illustrating fundamental compositions of a first embodiment of the finder optical system according to the present invention when it is set in the wide angle condition and the telephoto condition respectively;

FIG. 5A and FIG. 5B are sectional views illustrating fundamental compositions of a second embodiment of the finder optical system according to the present invention when it is set in the wide angle condition and the telephoto condition respectively;

FIG. 8 shows graphs illustrating aberration characteristics of the first embodiment of the present invention in the wide angle condition thereof;

FIG. 9 shows curves illustrating aberration characteristics in the telephoto condition of the first embodiment of the present invention;

FIG. 12 shows curves illustrating aberration characteristics in the wide angle condition of the second embodiment of the present invention; and FIG. 13 shows curves illustrating aberration characteristics in the telephoto condition of the second embodiment of the present invention.

DESCRIPTION OF THE PREFERRED EMBODIMENTS

Figure 1A:
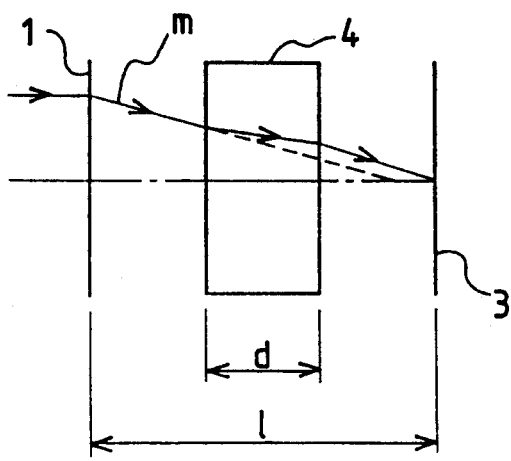
FIG. 1A and FIG. 1B are sectional views descriptive of the principle of the finder optical system according to the present invention.
Figure 1B:
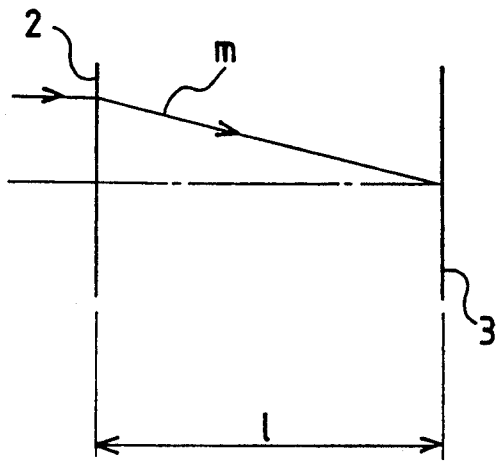

Prior to description of the embodiments of the finder optical system according to the present invention, the fundamental composition and functions of the finder optical system will be explained below:

FIG. 1A and FIG. 1B show sectional views descriptive of the principle of the finder optical system according to the present invention, in which an objective lens system 1 and another objective lens system 2, which have magnifications different from each other, are disposed so as to be inserted and removed into and out of one and the same optical path m. Located, after either of the two objective lens systems is an image surface on which an image of an object to be photographed is to be formed and a distance as measured from the objective lens system to the image surface 3 remains unchanged whether the objective lens system 1 or the objective lens system 2 is selected.

Further, disposed between the objective lens system 1 or 2 and the image surface 3 is a parallel plate 4 which has thickness d and a refractive index n so as to be inserted and removed into and out of the optical path m. This parallel plate 4 is inserted into the optical path (see FIG. 1A) when the objective lens system 1 is selected, whereas the parallel plate is removed from the optical path m (see FIG. 1B) and the space to be occupied by the parallel plate is filled with air when the objective lens system 2 is selected, whereby a magnification of the finder optical system is changed.

When a ratio between a focal length $f_1$ of the objective lens system obtained by inserting the parallel plate into the optical path m and another focal length $f_2$ of the objective lens system obtained by removing the parallel plate from the optical path m is represented by a reference symbol of z, the ratio is expressed by the following formula (1):

$$z = f_1/f_2 = 1/1 - \{(n-1)/n \cdot d/f_2\} \tag{1}$$

As is understood from the formula (1), $d/f_2$ as an upper limit of $n/(n-1)$ since z is infinitely large in a condition expressed by the following formula (2):

$$1 - (n-1)/n \cdot d/f_1 = 0 \tag{2}$$

Figure 2:
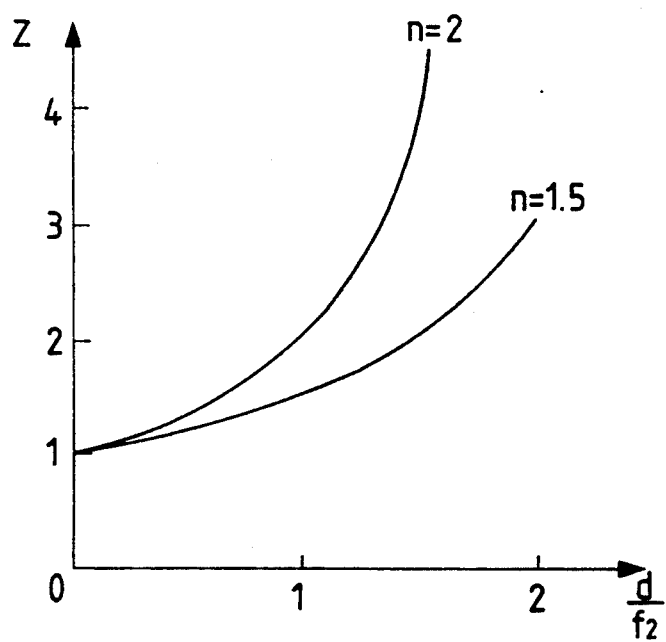
FIG. 2 shows graphs illustrating ratios between focal lengths of two types of objective lens system which use parallel plates respectively having refractive indices different from each other.

FIG. 2 exemplifies values of z in a case where the parallel plate has a refractive index $n=1.5$ and another case where the parallel plate has a refractive index $n=2$. So far as the parallel plate 4 is made of ordinary glass materials, variable magnification ratios are obtainable within a range of $z=1.5$ to 2. It will be understood from FIG. 2 that the parallel plate can exhibit the variable magnification effect thereof sufficiently within a range of $0.4 < d/f_2$.

Hence, it is desirable to satisfy the following condition:

$$0.4 < d/f_2 < n/(n-1)$$

It is possible to change an optical path length in the space located after the objective lens system 1 or 2, by inserting and removing the parallel plate 4 into and out of the optical path m, without changing the distance as measured from the objective lens system 1 or 2 to the image surface 3 and obtain the variable magnification effect easily by adequately selecting the focal length $f_1$ or $f_2$ of the objective lens system 1 or 2.

Figure 3A:
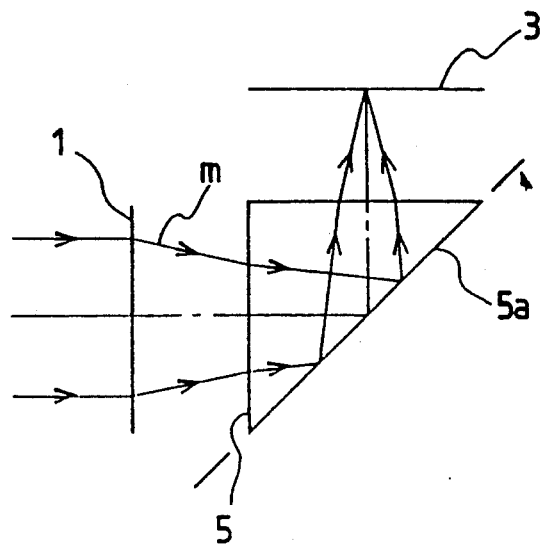
FIG. 3A and FIG. 3B are sectional views illustrating a principle of compositions of the finder optical system according to the present invention when it is set in a wide angle condition and telephoto condition respectively.
Figure 3B:
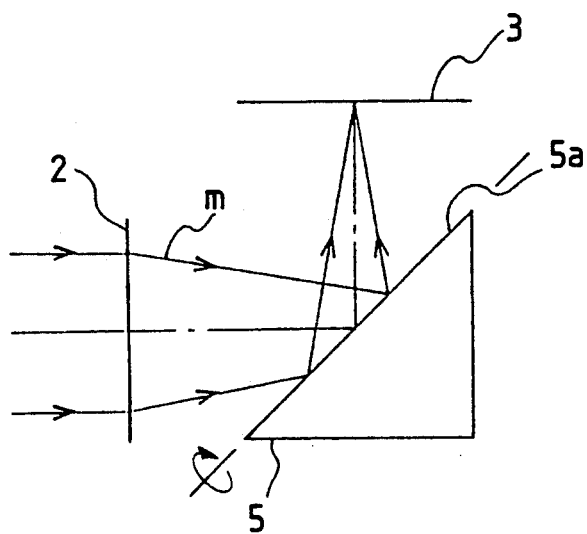

In order to insert and remove the parallel plate 4 by using a simple mechanism and within a possible minimum moving space, the finder optical system according to the present invention adopts, in place of the parallel plate 4, a rotatable prism 5 which has a reflecting surface 5a serving for folding the optical path between the objective lens system 1 or 2 and the image surface 3 as illustrated in FIG. 3A and FIG. 3B. Speaking more concretely, the prism 5 is disposed so as to be rotatable 180° around an axis line on the reflecting surface 5a. Accordingly, the prism 5 can be set a first position at which the prism is inserted into the optical path m so that a light bundle m having passed through the objective lens system 1 enters the prism 5, is reflected by the reflecting surface 5a and emerges toward the image surface 3 as shown in FIG. 3A and a second position at which the light bundle having passed through the objective lens system 2 does not enter the prims 5, is reflected by the reflecting surface 5a and travels toward the image surface 3 as shown in FIG. 3B. Consequently, optical path length can be changed by rotating the prism 5. A magnification of the finder optical system can be changed easily by inserting and removing the objective lens systems 1 and 2 having the focal lengths $f_1$ and $f_2$ matched with a magnification desired for the finder optical system into and out of the optical path m along with the rotation of the prism 5.

The finder optical system can have an enhanced variable magnification ratio by configuring the prism 5 so that the surface of incidence and the surface of emergence thereof function as lens elements. Further, one of the objective lens systems may be integrated with the prism 5.

FIG. 4A and FIG. 4B show an example wherein the surface of incidence and surface of emergence of the prism 5 have the functions of lens elements. In case of a prism 5' illustrated in these drawings, a surface of incidence 5'b and a surface of emergence 5'c for a light bundle are convex outward so as to have the functions of lens elements, and the prism 5 is configured so as to have a form that is integrated with the objective lens system 1 having the focal length $f_1$. Accordingly, an objective lens system is composed only of the prism 5' in the wide angle condition illustrated in FIG. 4A. Moreover, the prism 5' is rotatable 180° in a direction in parallel with the paper surface (in the direction indicated by the arrow) around an intersection 0 between the reflecting surface 5'a and the optical axis of the light bundle m, and the objective lens 2 having the focal length $f_2$ or telephotographing is rotatable together with the prism 5'.

Accordingly, the objective lens system 2 is set at a location 180° apart from the surface of incidence 5'b and is disposed outside the optical path in the wide angle condition (see FIG. 4A). In the telephoto condition illustrated in FIG. 4B, in contrast, the objective lens system 2 is rotated 180° together with the prism 5' so that the objective lens system 2 and the reflecting surface 5'a of the prism 5' are disposed in the optical path m.

In this case, the composition of the finder optical system can be simplified by reducing the number of the parts of this optical system since the objective lens system for telephotographing can be omitted.

In addition, it is possible to adopt, in place of the prism 5, a rotatable prism 5'' which has a rear conversion function. This prism 5'' permits using an objective lens system 6 which is to be used commonly with wide angle photographing and telephotographing, and fixed in the optical path m. In this case, the number of the parts required for composing the finder optical system can be reduced and the space required for inserting and removing the movable member into and out of the optical path m can further be reduced since it is sufficient to move only the prism 5'' so as to be inserted and removed into and out of the optical path m.

Now, the embodiments of the finder optical system according to the present invention will be described below:

The finder optical system preferred as the first embodiment of the present invention has a fundamental composition illustrated in FIG. 4A and FIG. 4B. In the wide angle condition shown in FIG. 4A, an objective system lens is composed only of the prism 5'. The telephoto condition shown in FIG. 4B is established by rotating the prism 5' and the objective lens 2 around an axis 0.

Figure 6:
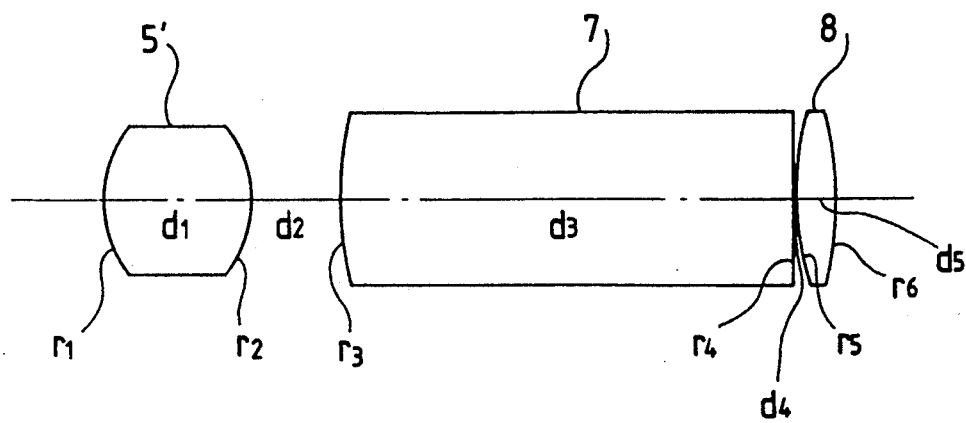
FIG. 6 is a sectional view illustrating the finder optical system shown in FIG. 4A in a state where it is developed in the direction of the optical axis.
Figure 7:
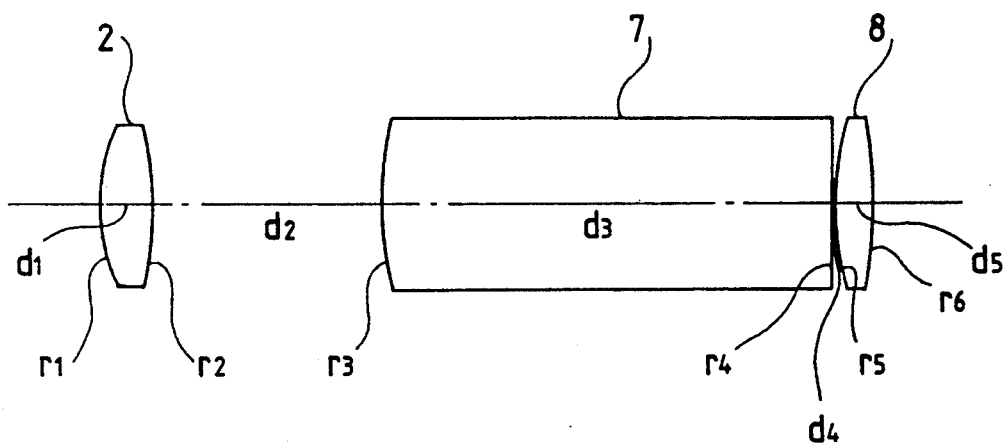
FIG. 7 is a sectional view illustrating the finder optical system shown in FIG. 4B in a state where it is developed in the direction of the optical axis.

FIG. 6 illustrates the composition of the finder optical system shown in FIG. 4A in a state wherein the finder optical system is developed in the direction of the optical axis. In FIG. 6, disposed after the prism 5' are an image erecting optical system 7 for inverting an image and an eyepiece optical system. FIG. 7 illustrates in a state developed in the direction of the optical axis, the composition of the finder optical system shown in the telephoto condition thereof in FIG. 4B. FIG. 8 and FIG. 9 show curves illustrating spherical aberrtion, curvature of field and distortion in the wide angle condition and the telephoto condition of the finder optical system preferred as the first embodiment of the present invention.

Numerical data of the first embodiment of the finder optical system according to the present invention will be listed below:

---

$d/f_2 = 1.108$
(Wide angle condition)
$\omega = 28°$

---

$r_1 = 8.9100$
$\quad\quad\quad\quad d_1 = 9.7420 \quad n_1 = 1.49230 \quad \nu_1 = 57.71$
$r_2 = -5.3804$ (Aspherical surface)
$\quad\quad\quad\quad d_2 = 6.0906$
$r_3 = 21.5801$
$\quad\quad\quad\quad d_3 = 30.5161 \quad n_2 = 1.49230 \quad \nu_2 = 57.71$
$r_4 = \infty$
$\quad\quad\quad\quad d_4 = 0.2000$
$r_5 = 17.6406$ (Aspherical surface)
$\quad\quad\quad\quad d_5 = 2.5000 \quad n_3 = 1.49230 \quad \nu_3 = 57.71$
$r_6 = -27.3286$

---

Aspherical coefficient

Second Surface
$P = 1 \quad E = -0.15500 \times 10^{-2} \quad F = 0.61962 \times 10^{-4}$
$G = -0.36763 \times 10^{-5} \quad\quad\quad\quad H = 0.12025 \times 10^{-6}$ Fifth surface
$P = 1 \quad E = -0.55186 \times 10^{-4} \quad F = 0.17827 \times 10^{-6}$
$G = -0.10366 \times 10^{-7} \quad\quad\quad\quad H = 0.10093 \times 10^{-9}$

---

(Telephoto condition)
$\omega = 15.2°$ $r_1 = 13.1488$
$\quad\quad\quad\quad d_1 = 3.5000 \quad n_1 = 1.49230 \quad \nu_1 = 57.71$
$r_2 = -19.4145$ (Aspherical surface)
$\quad\quad\quad\quad d_2 = 15.5334$
$r_3 = 21.5801$
$\quad\quad\quad\quad d_3 = 30.5161 \quad n_2 = 1.49230 \quad \nu_2 = 57.71$
$r_4 = \infty$
$\quad\quad\quad\quad d_4 = 0.2000$
$r_5 = 17.6046$ (Aspherical surface)
$\quad\quad\quad\quad d_5 = 2.5000 \quad n_3 = 1.49230 \quad \nu_3 = 57.71$
$r_6 = -27.3286$

---

Aspherical coefficients

Second surface
$P = 1.2556 \quad E = 0.18277 \times 10^{-3} \quad F = 0.11249 \times 10^{-5}$
$G = -0.32375 \times 10^{-7} \quad\quad\quad\quad H = -0.78195 \times 10^{-9}$ Fifth surface
$P = 1 \quad E = -0.55186 \times 10^{-4} \quad F = 0.17827 \times 10^{-6}$
$G = -0.10366 \times 10^{-7} \quad\quad\quad\quad H = 0.10093 \times 10^{-9}$

---

Now, description will be made of a finder optical system which has a composition illustrated in FIG. 5A and FIG. 5B, and preferred as the second embodiment of the present invention. In the wide angle condition illustrated in FIG. 5A, an objective lens 6 is fixed in the optical path, and a prism 5'' having the rear conversion function is located in the optical path between the objective lens 6 and an image erectimg optical system 7. When the prism 5'' is rotated 180° in the direction indicated by the arrow, the finder optical system is set in the telephoto condition where the prism 5" is removed out of the optical path m and a reflecting surface 5"a is located in the optical path m as shown in FIG. 5B.

Figure 10:
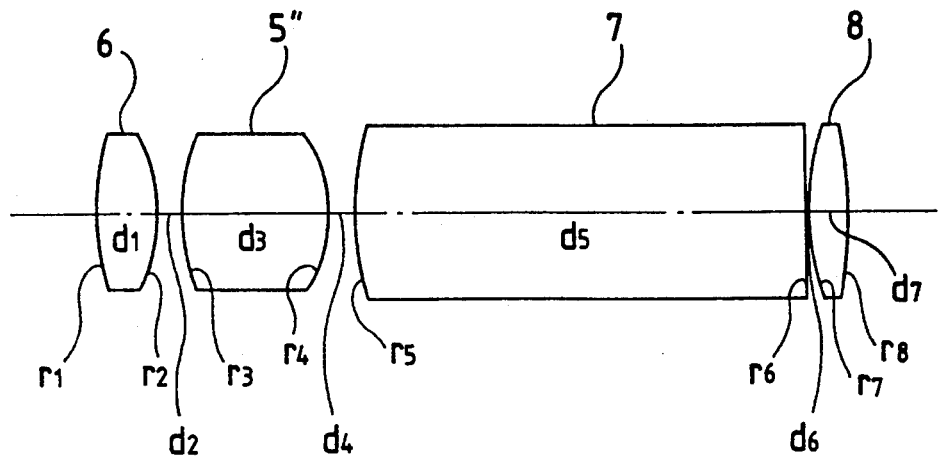
FIG. 10 is a sectional view illustrating the finder optical system shown in FIG. 5A in a state where it is developed in the direction of the optical axis.
Figure 11:
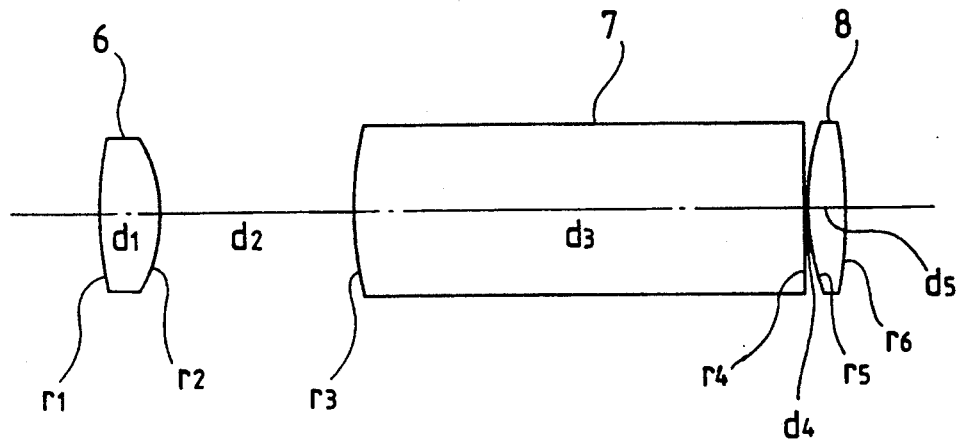
FIG. 11 is a sectional view illustrating the finder optical system shown in FIG. 5B in a state where it is developed in the direction of the optical axis.

FIG. 10 illustrates the composition, in the wide angle condition shown in FIG. 5A, of the finder optical system in a state where it is developed in the direction of the optical axis. Disposed after the objective lens 6 and the prism 5" are the image erecting optical system 7 and an eyepiece optical system 8. FIG. 11 illustrates the composition, in the telephoto condition, of the finder optical system in a state where it is developed in the direction of the optical axis. FIG. 12 and FIG. 13 show graphs illustrating spherical aberration, curvature of field and distortion in the wide angle condition and the telephoto condition respectively of the second embodiment of the present invention.

Numerical data of the second embodiment of the present invention will be listed below:

$d/f_2 = 1.115$
(Wide angle condition)
$\omega = 28°$ $r_1 = 19.5001$
  $d_1 = 4.0000$  $n_1 = 1.49230$  $\nu_1 = 57.71$
$r_2 = -9.6764$ (Aspherical surface)
  $d_2 = 1.7016$
$r_3 = 14.4842$
  $d_3 = 9.8000$  $n_2 = 1.49230$  $\nu_2 = 57.71$
$r_4 = -5.4662$ (Aspherical surface)
  $d_4 = 1.7998$
$r_5 = 21.5801$
  $d_5 = 30.5161$  $n_3 = 1.49230$  $\nu_3 = 57.71$
$r_6 = \infty$
  $d_6 = 0.2000$
$r_7 = 17.6046$ (Aspherical surface)
  $d_7 = 2.5000$  $n_4 = 1.49230$  $\nu_4 = 57.71$
$r_8 = -27.3286$ Aspherical coefficient
Second Surface
$P = 1.2556$  $E = 0.26962 \times 10^{-2}$  $F = 0.25505 \times 10^{-5}$
$G = -0.49236 \times 10^{-7}$  $H = 0.73175 \times 10^{-7}$ Fourth surface
$P = +0.39578$  $E = 0.28921 \times 10^{-2}$
$\times 10^{-5}$ Seventh surface
$P = 1$  $E = -0.55186 \times 10^{-4}$  $F = 0.17827 \times 10^{-6}$
$G = -0.10366 \times 10^{-7}$  $H = 0.10093 \times 10^{-9}$ (Telephoto condition)
$\omega = 18.8°$ $r_1 = 19.5001$
  $d_1 = 4.0000$  $n_1 = 1.49230$  $\nu_1 = 57.71$
$r_2 = -9.6764$ (Aspherical surface)
  $d_2 = 13.3014$
$r_3 = 21.5801$
  $d_3 = 30.5161$  $n_2 = 1.49230$  $\nu_2 = 57.71$
$r_4 = \infty$
  $d_4 = 0.2000$
$r_5 = 17.6046$ (Aspherical surface)
  $d_5 = 2.5001$  $n_3 = 1.49230$  $\nu_3 = 57.71$
$r_6 = -27.3286$ Aspherical coefficients
Second surface
$P = 1.2556$  $E = 0.26962 \times 10^{-3}$  $F = 0.25505 \times 10^{-5}$
$G = -0.49236 \times 10^{-7}$  $H = 0.73175 \times 10^{-9}$ Fifth surface
$P = 1$  $E = -0.55186 \times 10^{-4}$  $F = 0.17827 \times 10^{-6}$
$G = -0.10366 \times 10^{-7}$  $H = 0.10093 \times 10^{-9}$ In the numerical data listed above, the reference symbols $r_1, r_2, \ldots$ represent radii of curvature on the respective lenses, the reference symbols $d_1, d_2, \ldots$ designate thicknesss of the respective lenses and airspaces reserved therebetween, the reference symbols $n_1, n_2, \ldots$ denote radii of curveture on the respective lenses, and the referencee symbols $\omega_1, \omega_2, \ldots$ represent Abbe's numbers of the respective lenses for the d-line.

The aspherical surfaces used in the embodiments described above have shapes expressed by the following formula using the aspherical surface coefficients listed above:

$$x = \frac{s^2/r}{1 + \sqrt{1 + SP^2/r^2}} + E \cdot S^4 + F \cdot S^6 + G \cdot S^8 + H \cdot S^{10}$$

were in reference symbol r represents a paraxial radius of curvature, and the reference symbols P, E, F, G and H designate the aspherical coefficients.

What is claimed is:

1. A variable magnification optical system comprising:
   an objective lens system having a positive refractive power and remaining fixed during magnification change;
   an image erecting optical system for erecting an image formed by said objective lens system, said image erecting optical system being disposed after said objective lens system;
   an eyepiece lens system having a positive refractive power and being disposed after said image erecting optical system;
   a prism functioning as a lens element and disposed in an optical path between a surface, closest to an object, of said objective lens system and said image erecting optical system, said prism having a reflecting surface therein so that outer and inner sides of said reflecting surface make contact with air and a medium of said prism, respectively;
   wherein by rotating said prism in such a manner that the outer and inner sides of said reflecting surface replace one another, one of the sides of said reflecting surface contacting air and the medium of said prism, respectively, is inserted into an optical path in place of the other side to change magnification.

2. A variable magnification finder optical system according to claim 1 wherein at least one of a surface of incidence and a surface of emergence of said prism is convex.

3. A variable magnification finder optical system, disposed adjacent to a photographing optical system for photographing an object image, for indicating photographing conditions to a viewer, comprising:
   an objective lens system having a positive refractive power;
   an image erecting optical system for erecting an image formed by said objective lens system, said image erecting optical system being disposed after said objective lens system;
   an eyepiece lens system having a positive refractive power being disposed after said image erecting optical system; and
   a right-angle prism disposed in an optical path between a surface, closest to an object, of said objective lens system and said image erecting optical system, said right-angle prism having a reflecting surface disposed along face serving as a hypotenuse thereof so that the outer and inner sides of said reflecting surface contact with air and a medium of said right-angle prism, respectively;

wherein by rotating said right-angle prism, one of the sides of said reflecting surface contacts air and the medium of said right-angle prism, respectively, is inserted into an optical path of said finder optical system in place of the other side of said reflecting surface, so that said finder optical system changes in field magnification simultaneous with a change in focal length of a photographing optical system so as to properly indicate a photographic range.

4. A variable magnification finder optical system according to claim 3 wherein said prism has a function of a lens element.

5. A variable magnification finder optical system according to claim 3 wherein said objective lens system is rotated with said prism.

6. A variable magnification finder optical system according to claim 3 wherein at least one of a surface of incidence and a surface of emergence of said prism is convex.

* * * * *